United States Patent [19]
Henderson

[11] Patent Number: 5,892,557
[45] Date of Patent: Apr. 6, 1999

[54] ADJUSTABLE-HEIGHT DEVICE FOR VIEWING AN AUDIOVISUAL WORK

[76] Inventor: Brian N. Henderson, 17108 SE. 29 Ct., Bellevue, Wash. 98008

[21] Appl. No.: 834,093

[22] Filed: Apr. 14, 1997

[51] Int. Cl.[6] .......................... H04N 5/645; H04N 5/655; E04G 3/00

[52] U.S. Cl. .................... 348/825; 348/827; 248/292.13; 248/919

[58] Field of Search ..................................... 348/825, 827, 348/836, 842, 53; 248/917, 918, 919, 123.11, 292.11, 292.13; 312/223.3; 345/8

[56] References Cited

U.S. PATENT DOCUMENTS

| | | | |
|---|---|---|---|
| 4,449,799 | 5/1984 | Turner | 353/119 |
| 5,041,770 | 8/1991 | Seiler et al. | 248/919 |
| 5,437,235 | 8/1995 | Randolph | 312/223.3 |
| 5,785,630 | 8/1996 | Bobick et al. | 482/4 |

*Primary Examiner*—Kim Yen Vu
*Assistant Examiner*—Kimberly A. Williams

*Attorney, Agent, or Firm*—Seed and Berry LLP

[57] ABSTRACT

A device for viewing an audiovisual work is shown and described. A hooded enclosure containing a monitor is mounted on an adjustable-height support, the monitor being movable from an initial position to a user-selected viewing height. The enclosure is provided with handles which are grasped and pulled by the user to lower the enclosure to the user-selected viewing height, and the support is provided with a biasing member which automatically returns the enclosure to the initial height when the enclosure is released by the user. A switch is coupled to the support, such that when the enclosure is lowered toward the user-selected viewing height, the switch is activated, thereby starting the audiovisual work. Conversely, when the enclosure is released by the user, the biasing member returns the enclosure to its initial position, and the switch is deactivated, thereby automatically stopping the audiovisual work. The enclosure is sized to receive the head of the user therein and is configured to shield the user from external light, sound and glare, and speakers are provided within the enclosure, to provide an immersive audiovisual experience for the user.

20 Claims, 2 Drawing Sheets

ADJUSTABLE-HEIGHT DEVICE FOR VIEWING AN AUDIOVISUAL WORK

TECHNICAL FIELD

This invention relates to devices for viewing audiovisual works.

BACKGROUND OF THE INVENTION

Audiovisual works are viewed in numerous different situations, for a variety of purposes, such as entertainment and education. Many times, it is desirable or necessary to view an audiovisual work in a public location, for example at a trade show to learn more about a product or service, or in an airport to pass the time while waiting for a flight.

Currently available devices for viewing an audiovisual work include television and computer monitors that are placed in a given location for viewing by one or more people. Such devices have shortcomings, however, in that they may be difficult for a user to view and hear the audiovisual work, given the fixed location of the monitor, as well as external light, glare and sound.

A need therefore exists for an improved device for viewing audiovisual works.

SUMMARY OF THE INVENTION

In a preferred embodiment, an enclosure surrounding a monitor is mounted on an adjustable-height support. The enclosure has an opening through which a user may view the monitor, and the enclosure is configured to shield the user from external light and sound when in use. The enclosure is movable from an initial position to a user-selected viewing height, the enclosure being provided with handles that are grasped and used by the viewer to pull the enclosure to the user-selected viewing height. In a preferred embodiment, the viewing device has a range of motion which accommodates users ranging from a seven-foot tall user to a seated user. The enclosure is further provided with a pull-down device which is reachable by a seated user to enable someone in a seated position to pull the enclosure to a comfortable height.

A switch is coupled to the adjustable-height support such that as the enclosure is lowered to the user-selected viewing height, the switch is activated, thereby initiating the playing of the audiovisual work. When the user releases the enclosure, the enclosure is automatically returned to its original position by a biasing member coupled to the support, and the switch is deactivated, thereby stopping the playing of the audiovisual work.

Speakers are mounted within the enclosure to provide an immersive experience for the user, and one of the handles is provided with a device for adjusting the volume of the audiovisual work, thereby allowing the user to adjust the volume without withdrawing his or her attention from the audiovisual work.

DETAILED DESCRIPTION OF THE INVENTION

Figure 1:
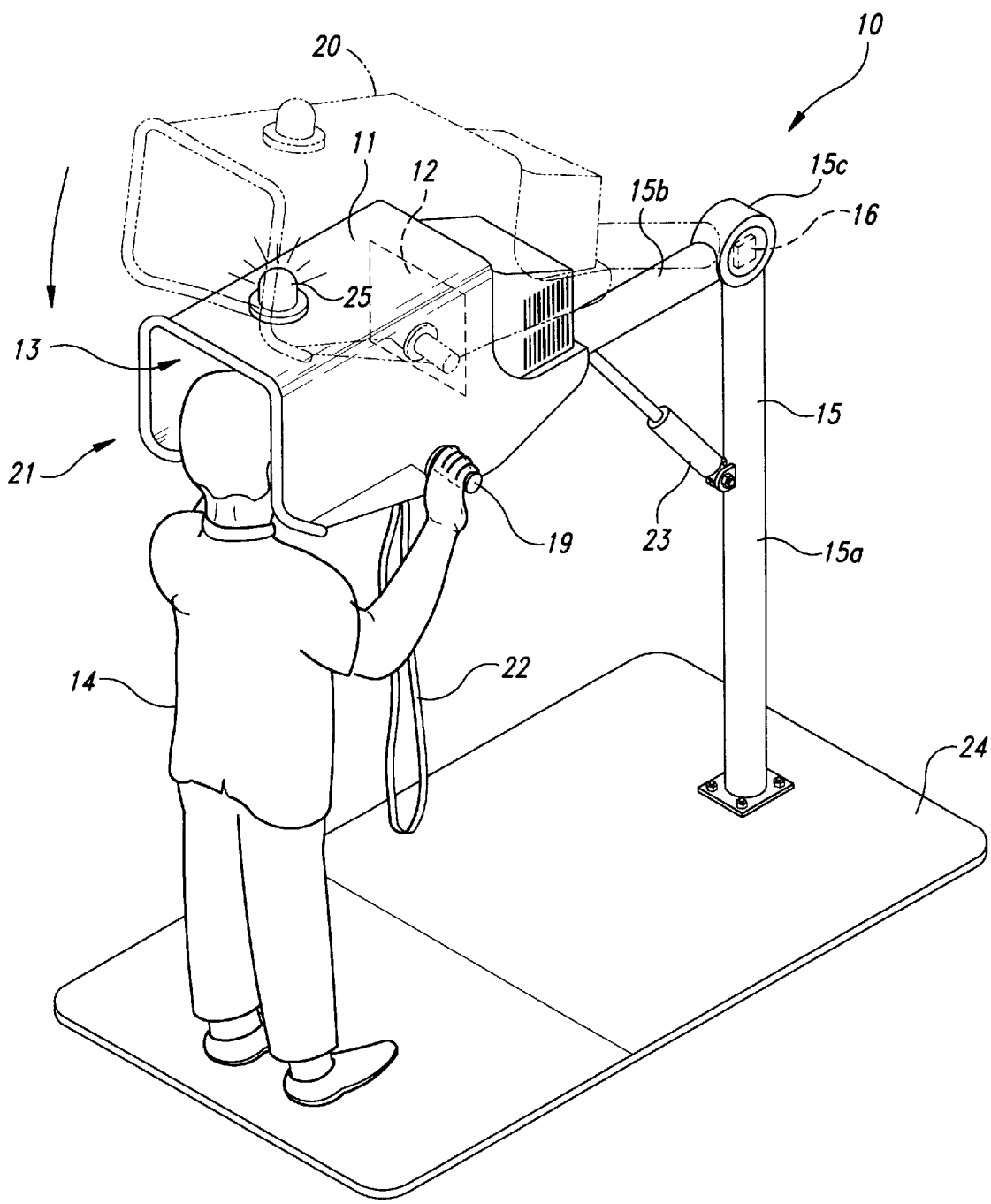
FIG. 1 is a front isometric view of a device provided in accordance with a preferred embodiment of the present invention.

An improved device 10 for viewing an audiovisual work is provided in accordance with a preferred embodiment of the present invention. As illustrated in FIG. 1, the device is provided with an enclosure 11 mounted on an adjustable-height support 15. Positioned in a rear region of the enclosure 11 is the viewing screen of a monitor 12, which is viewed by a user 14 via a front enclosure opening 13. Although a variety of monitors and operating systems may be used, in a preferred embodiment, a computer system and monitor are used, allowing the user 14 to view a variety of works in a variety of formats, for example on a CD-ROM or a digital video disk. In an alternative embodiment, a high-definition television or monitor is used.

The enclosure 11 is moved from a raised initial position 20 to a user-selected viewing height 21 by grasping the handles 19 provided on either side of the enclosure 11, and pulling the enclosure downward. The user-selected viewing height 21 is the height comfortable for the user 14 to view the monitor with the user's head within the enclosure 11, and depends on the height of the user and whether the user is standing or seated. In a preferred embodiment, the device 10 has a range of motion of approximately 28 inches that accommodates users ranging from a seven-foot tall user to a seated user. As further illustrated in FIG. 1, a pull-down device 22, such as a strap, is coupled to the enclosure 11, the strap 22 being reachable by a seated user.

In a preferred embodiment, the support 15 is comprised of a post 15a having a pivoted arm 15b pivotally attached thereto. The enclosure 11 is mounted at the free end of the pivot arm 15b. The post 15a is mounted on a base 24 and a switch 16 is mounted in the pivot coupling 15c, such that as the enclosure 11 is lowered from the raised initial position 20 toward the user-selected viewing height 21, the switch 16 is activated, thereby initiating the viewing of the audiovisual work. The switch 16 may also be coupled to a light 25, such that the light is turned on and/or flashes when the device 10 is being used and the audiovisual work is being viewed.

The device 10 further includes a biasing member 23 extending between the post 15a and the pivot arm 15b, which automatically returns the enclosure 11 to the initial position 20 when the enclosure is released by the user. Although a variety of biasing members may be used, in a preferred embodiment a conventional gas strut, such as that found on a car's hatchback, may be used. Alternatively, a spring may be used for the biasing member. When the enclosure 11 is released by the user 14, the enclosure is returned to its initial position 20, and the switch 16 is deactivated, thereby automatically stopping the playing of the audiovisual work. If the switch 16 is coupled to a light 25, the return of the enclosure 11 toward the raised initial position 20 will also turn the light 25 off. Although a variety of switches may be used, in a preferred embodiment, a computer mouse switch is used.

Figure 2:
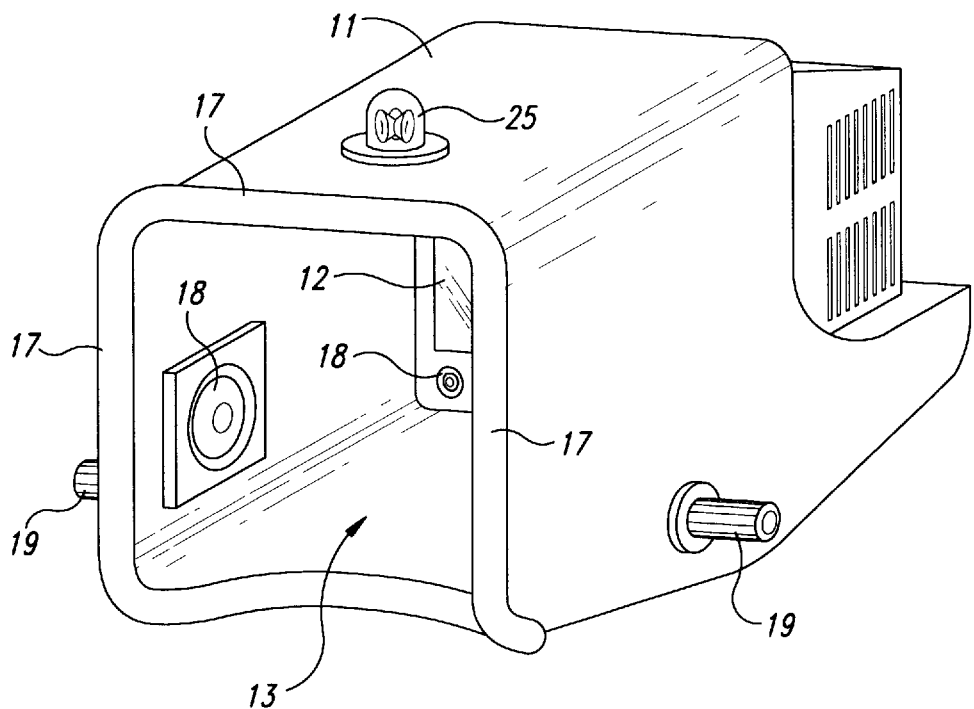
FIG. 2 is an enlarged, front isometric view of a portion of the device illustrated in FIG. 1.

As best seen in FIG. 2, the enclosure 11 has sides 17 which are configured to shield the user 14 from external or ambient light, noise and glare when the enclosure 11 is lowered to the user-selected viewing height 21, and the user has his head within the enclosure and is viewing the monitor 12 through opening 13. Speakers 18 are positioned within enclosure 11. Although a variety of speakers may be used, stereo computer speakers are used in a preferred embodiment. A user of a device provided in accordance with a preferred embodiment of the present invention is therefore provided with an immersive, audiovisual experience, given the shielded nature of enclosure 11, and the position of the audio speakers. To further ensure that the user's attention is not withdrawn from the audiovisual work, one of the handles 19 is provided with a volume control for the audiovisual work. Although a variety of devices may be used, in a preferred embodiment, the handle 19 is a motorcycle type throttle (which controls a volume control switch), the volume of the audiovisual work being adjusted by simply rotating the handle. In this manner, the user may adjust the volume without diverting his or her attention from the audiovisual work.

Although the device 10 provided in accordance with a preferred embodiment of the present invention has been illustrated in FIGS. 1 and 2 as being configured for use by a single user, it will be understood that the device may be modified, for example by widening the enclosure, to accommodate two or more viewers.

An improved device for viewing an audiovisual work has been shown and described. From the foregoing, it will be appreciated, although embodiments of the invention have been described herein for purposes of illustration, that various modifications may be made without deviating from the spirit of the invention. Thus, the invention is not limited to the embodiments described herein, but rather is defined by the claims which follow.

I claim:

1. An adjustable-height device for viewing an audiovisual work comprising:

an enclosure surrounding a monitor viewing screen and having an opening through which a user may view the monitor, the enclosure being mounted on an adjustable-height support containing a switch, such that the enclosure may be lowered from an initial position to a user-selected viewing height, the switch being activated when the enclosure is lowered thereby initiating the playing of the audiovisual work, the switch being deactivated when the enclosure is raised toward its original height, thereby stopping the playing of the audiovisual work.

2. The device according to claim 1 wherein the enclosure is sized to receive therein at least a portion of the head of the user and is configured to shield the user from external light and sound when the enclosure is lowered to the user-selected viewing height and the user looks through the opening.

3. The device according to claim 1, further comprising a biasing member that automatically returns the enclosure to its initial position when the enclosure is released by the user.

4. The device according to claim 1 wherein audio speakers are mounted within the enclosure.

5. The device according to claim 1 wherein a handle is coupled to the enclosure, such that the user may grasp the handle to lower the enclosure to the user-selected height.

6. The device according to claim 5 wherein the handle is provided with a device for adjusting the volume of the audiovisual work.

7. The device according to claim 6 wherein the handle is a motorcycle type throttle.

8. The device according to claim 1 wherein the enclosure has a range of motion of approximately 28 inches that accommodates users ranging from a seven-foot tall user to a seated user.

9. The device according to claim 1 wherein a pull-down device is coupled to the enclosure, the pull-down device being reachable by a seated user.

10. The device according to claim 1 wherein the adjustable-height support further comprises a pivoted arm supporting the enclosure and a biasing member, the biasing member automatically returning the pivoted arm and the enclosure supported thereby to its initial position when the enclosure is released by the user.

11. The device according to claim 10 wherein the biasing member is a gas strut.

12. The device according to claim 10 wherein the biasing member is a spring.

13. An adjustable-height device for viewing an audiovisual work comprising:

an enclosure at least partially surrounding a monitor and having an opening through which a user may view the monitor, the enclosure being mounted on an adjustable-height support, the enclosure being movable from an initial position to a user-selected viewing height, the enclosure being configured to substantially shield the user from external light and sound when the enclosure is lowered to the user-selected viewing height and the user looks through the opening;

a switch coupled to the adjustable-height support such that the switch is activated when the enclosure is lowered toward the user-selected viewing height, thereby initiating the playing of the audiovisual work, the switch being deactivated when the enclosure is raised toward its original position, thereby stopping the playing of the audiovisual work; and a biasing member coupled to the adjustable-height support that automatically returns the enclosure to its initial position when the enclosure is released by the user.

14. The device according to claim 13 wherein a handle is coupled to the enclosure, such that the user may grasp the handle to lower the enclosure to the user-selected height.

15. The device according to claim 13 wherein the handle is provided with a device for adjusting the volume of the audiovisual work.

16. The device according to claim 13 wherein the enclosure has a range of motion of approximately 28 inches that accommodates users ranging from a seven-foot tall user to a seated user.

17. The device according to claim 13 wherein a pull-down device is coupled to the enclosure, the pull-down device being reachable by a seated user.

18. The device according to claim 13 wherein the biasing member is a gas strut.

19. The device according to claim 13 wherein audio speakers are mounted within the enclosure.

20. An adjustable-height device for viewing an audiovisual work comprising:

an enclosure at least partially surrounding a monitor viewing screen and having an opening through which a user may view the monitor, the enclosure being mounted on an adjustable-height support, the enclosure being movable from an initial position to a user-selected viewing height, the enclosure being sized to receive therein at least a portion of the head of the user and configured to substantially shield the user from external light and sound when the enclosure is lowered to the user-selected viewing height and the user looks through the opening.

* * * * *